April 24, 1956

L. BELGARDE 2,743,018

OIL FILTERS

Filed March 10, 1954

INVENTOR.
LEO BELGARDE
BY
*Charles C. Willson*

ATTORNEY

April 24, 1956 L. BELGARDE 2,743,018
OIL FILTERS

Filed March 10, 1954 2 Sheets-Sheet 2

*INVENTOR.*
LEO BELGARDE
BY
Charlie C. William

ATTORNEY

United States Patent Office 2,743,018
Patented Apr. 24, 1956

2,743,018

OIL FILTERS

Leo Belgarde, Pawtucket, R. I., assignor to Fram Corporation, Providence, R. I., a corporation of Rhode Island Application March 10, 1954, Serial No. 415,232

4 Claims. (Cl. 210—183)

This invention relates to oil filters and more particularly to filters for filtering the lubricating oil supplied to the bearings of internal combustion engines.

Many motor vehicles are now provided with an oil filter for filtering the oil that is pumped to the engine bearings. Some of these filters are of the so-called full-flow type in which all of the oil pumped to the engine bearings, at a selected pressure, is filtered on its way to such bearings. These filters must handle a substantial flow of oil if the engine bearings are to be properly lubricated and cooled by this oil stream.

Another type of filter known as the part-flow or by-pass filter and which is now extensively used, does not filter the stream of oil as it travels to the engine bearings, but filters thoroughly a small portion of the circulating oil stream and returns this filtered portion to the crankcase. The theory is that if a small portion of the oil stream is filtered and returned to the crankcase, eventually all of the oil in the crankcase will be filtered, so as to supply clean oil to the engine bearings.

When an internal combustion engine is manufactured and is ready to be put into service, it is difficult to remove all of the so-called "built-in" dirt such as sand and metal particles; and if this dirt is not removed from the engine, it may enter the oil stream and be carried thereby to the engine bearings where it may seriously injure such bearings.

It is, therefore, considered important by some manufacturers of motor vehicles to employ a full-flow cartridge during the engine breaking-in period to filter all of the oil being forced to the engine bearings and thereby prevent the built-in dirt from reaching such bearings. After the motor vehicle has been driven about five hundred to one thousand miles, it may be desirable to filter the crankcase oil more thoroughly than can be done by a full-flow cartridge, so as to remove all dirt particles from the oil down to a size of from one to several microns. This can be done by employing a part-flow or by-pass filter cartridge.

Having in mind the foregoing, the present invention contemplates a good, practical oil filter which may be operated as a full-flow filter as long as desired and then operated as a part-flow filter. All that is necessary, as a result of the present invention, to effect this change from one type of filter to the other and to establish the proper oil paths is to insert in the filter shell either a full-flow cartridge or a part-flow cartridge.

An important feature of the present invention resides in the construction of the oil filter and in the cartridges used therein whereby the oil flow passages for a full-flow operation will be established by placing a full-flow cartridge in the shell, and the different oil flow passages required for a part-flow filtration operation will be established by removing the full-flow cartridge and placing a part-flow cartridge of special construction in the filter shell.

Stated more definitely, a primary feature of the present invention resides in an oil filter which may be converted into a full-flow filter or a part-flow filter by merely employing in such oil filter a full-flow cartridge or a part-flow cartridge as desired, since each cartridge is so constructed that it will establish the proper oil passages within the filter.

The above and other features of the present invention will be further understood from the following description when read in connection with the accompanying drawings, wherein.

Figure 1:
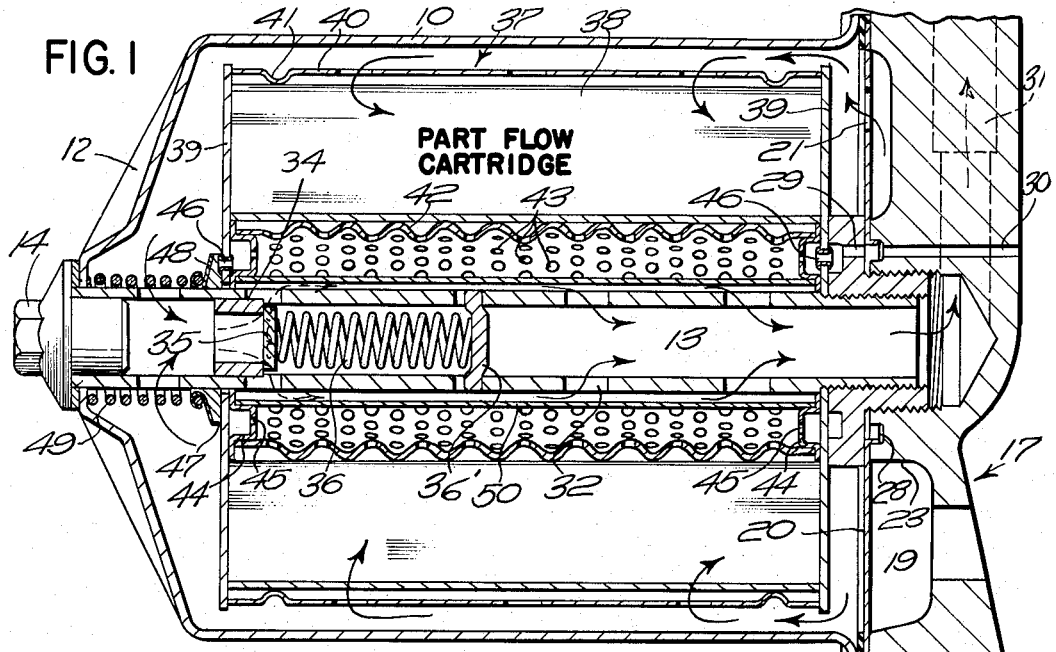
Fig. 1 is a longitudinal central sectional view through a part-flow filter constructed in accordance with the present invention.

The oil filter illustrated in the different views of the drawings is shown as mounted directly upon a metal casting forming an integral portion of an internal combustion engine, and has its central axis extending in a horizontal direction. It will be understood, however, that this is not essential, in that the oil filter shown may, if desired, be constructed so that it may be mounted in spaced relation to the engine, and this oil filter can, with a slight change, be adapted to operate when its axis extends in a vertical or inclined direction instead of extending horizontally.

Now referring to the drawings, the oil filter is shown as comprising a cup-shaped shell 10 formed of sheet metal drawn to the desired shape. This shell has a rounded outer end 11 having formed therein the depressed strengthening ribs 12, and this end is provided with a central hole adapted to receive a long center tube 13, which tube has welded or otherwise rigidly secured to its outer end the headed bolt 14 which has a large annular flange adapted to engage a gasket 15 and hold the gasket in sealing engagement with the end 11 of the metal shell.

The shell 10 as shown has an outwardly flaring annular flange 16 at its inner end, which is adapted to fit in an annular recess formed in the engine casting 17, to which casting the tube 13 is threadedly secured in a manner to be described. The casting 17 is provided with an inlet port 18 which leads to an annular recess 19 within the casting. Oil is supplied to this recess by the usual oil pump, not shown. The oil filter shown is, as above stated, designed to be mounted so that its central tube 13 extends in an approximately horizontal direction, and it is important that means be provided for preventing a large amount of the oil that reaches the filter shell 10 from draining out of the shell when the engine is not running. This is accomplished in the construction shown by providing in the recess formed in the casting 17 for the inner end of the shell 10 an anti-flow disc 20 such as a metal disc having formed near its upper peripheral edge an inlet oil passage 21. This disc is clamped between a surface of the casting 17 and the annular flange 16, a gasket 22 being confined between the disc 20 and flange 16. The arrangement is such that the oil supplied to the annular passage 19 will accumulate therein until it reaches a high enough level to pass through the hole 21 in the plate 20, so that when this oil passes into the shell 10 it cannot return by gravity to the engine pump and thereby empty the filter of oil.

Figure 5:
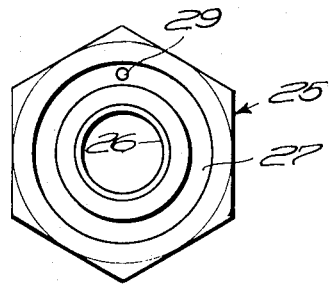
Fig. 5 is a plan view of an adaptor nut to be described.

The casting 17 is shown as having a central annular boss 23 which is internally threaded to receive the threaded outer surface 24 of an adaptor nut 25, which nut is best shown in Fig. 5. This nut is internally threaded as at 26 to receive the threaded inner end of the center tube 13. This nut is provided with an annular recess 27 formed in one face, and a second annular recess 28 formed in its other face, and extending between these two recesses is the small metering hole 29 which serves to determine the rate at which oil filtered by the part-flow cartridge, to be described, can escape from this cartridge and enter a drilled discharge passage 30 in the casting, to return to the engine crankcase. The oil which enters the center tube 13 will travel therein in the direction indicated by the arrows to a vertical passage 31 formed in the casting 17, to pass upwardly in this passage to the engine bearings to be lubricated. The adaptor nut 25 serves to provide a long threaded passage 26 that receives the relatively long threaded portion of the center tube 13 and firmly supports this tube. This nut serves also to provide the metering hole 29, above mentioned and which determines the rate at which oil from the part-flow cartridge can return to the crankcase. The outer shell 10 is clamped tightly in the position in which it is shown by applying a wrench to the bolt 14 to rotate the tube 13 in a direction to screw this tube far enough into the nut 25 to exert a clamping pressure on the gaskets 15 and 22, and thereby tightly seal the casing 10.

The center tube 13 is of uniform diameter and is provided throughout a major portion of its length with the holes 32 through which oil may pass into this tube. This tube is provided near its outer end with the additional holes 33 for receiving unfiltered oil, and fitted tightly in the bore of this tube against a shoulder formed therein is a ring 34 having its lower end shaped as shown to form a valve seat for a valve disc 35 preferably formed of a resin treated fibrous material. This disc is normally held seated against the valve ring 34 by a coiled spring 36, the outer end of which presses against this disc and the other end rests upon a pin 36' extending transversely of the tube 13 and mounted in holes in the tube. This construction forms a relief valve whereby if the cartridge being used in the casing 10 becomes clogged so that oil cannot filter therethrough, the increase in the oil pressure within the casing 10 will serve to unseat the disc 35 and permit the oil that enters the holes 33 to by-pass the filter cartridge, and pass through the center tube 13 and on to the engine bearings to thereby prevent failure of sufficient oil to reach these bearings when the cartridge is clogged.

Figure 2:
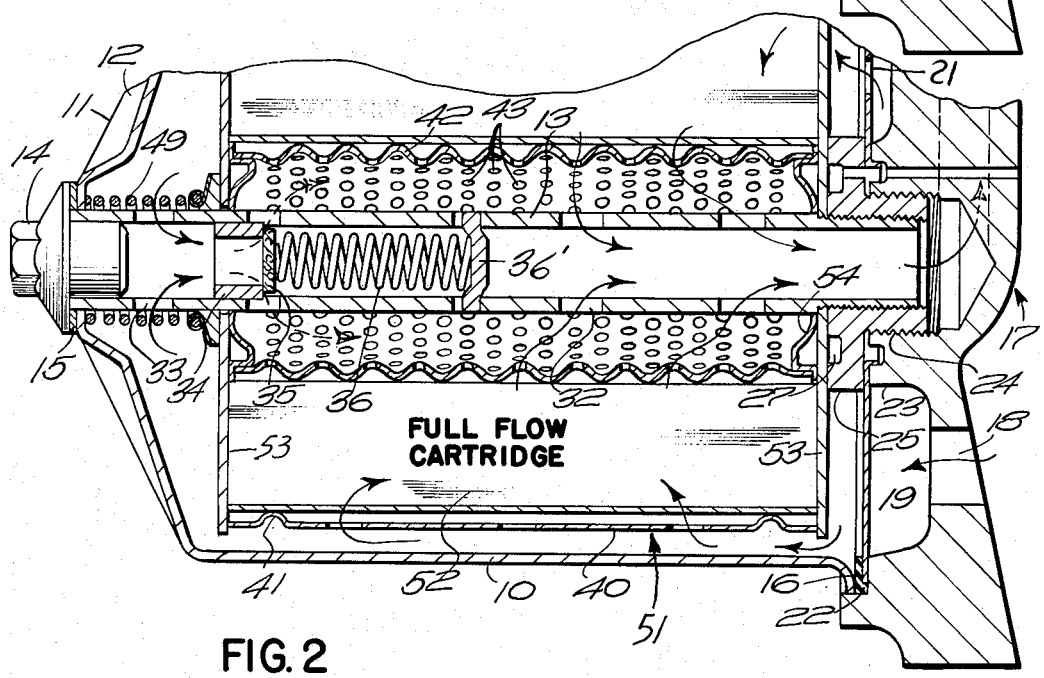
Fig. 2 is a similar view of a full-flow filter.

The construction so far described comprises the oil filter which is adapted to have mounted therein, either a full-flow cartridge or a part-flow cartridge as desired, and this filter construction is the same in Figs. 1 and 2 of the drawings. The construction of the part-flow cartridge shown in Figs. 1 and 3 of the drawings will now be described.

Figure 3:
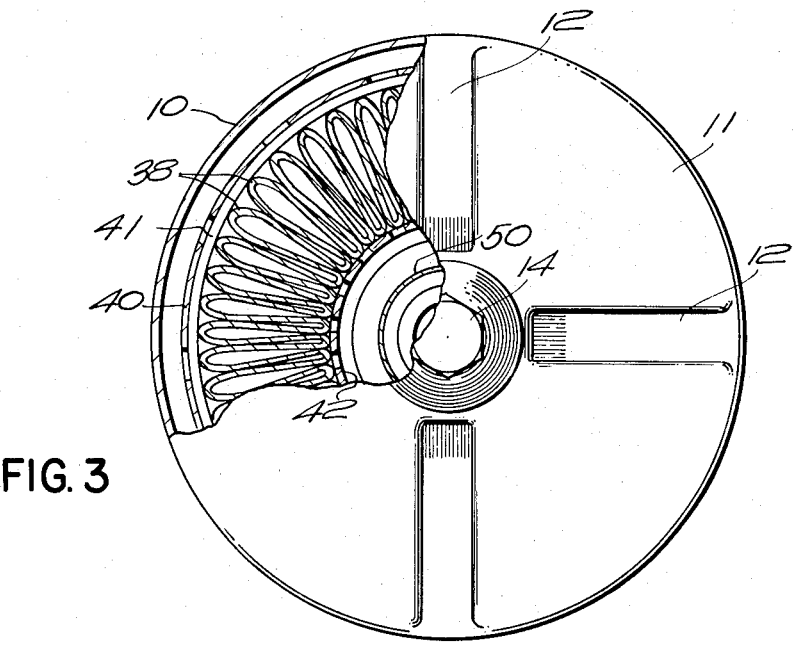
Fig. 3 is a plan view of the outer end of the filter of Fig. 1 with parts broken away to show the pleated filter annulus in the filter casing.
Figure 4:
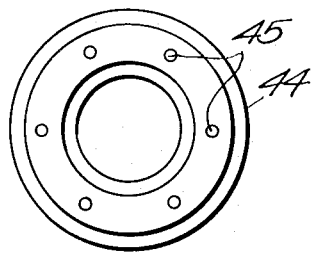
Fig. 4 is a plan view of a centering ring used in the construction of Fig. 1.

A part-flow cartridge, as above stated, passes oil relatively slowly but does a thorough filtering job; and because such a cartridge passes oil slowly, it cannot be used to supply oil directly to the engine bearings, as a higher flow of oil should be supplied to the engine bearings than will be passed by a part-flow cartridge, that is not excessively large in size. The part-flow cartridge shown in Fig. 1 of the drawing is designated in its entirety by the numeral 37 and this cartridge is formed primarily of a relatively thick porous paper having fine filtering properties and which is preferably treated with a resin that will stiffen the paper and increase its resistance to the dissolving action of the hot oil to be filtered. Such paper is commonly treated with a phenol formaldehyde resin. It is then pleated as shown in Fig. 3 of the drawing and the pleated paper is bent upon itself to form a pleated annulus 38 in which the pleats extend parallel to the central axis of this annulus. To the opposite ends of the annulus are adhesively secured by a plastic such as plastisol the discs 39 that are conveniently formed of a fibrous material such as paper that has been treated with a resin to make it more durable. These discs serve to seal the ends of the pleated annulus 38 and to help hold the pleats in the desired annular form. This pleated annulus is preferably confined in an outer metal wall 40 having holes therein and having the inwardly indented ribs 41 which contact the outer folds of the pleats 38 as shown. The inner folds of these pleats contact a center core 42 which is preferably corrugated as shown and is provided with the holes 43 that permit oil to pass inwardly through this core. The core 42 may be formed of stiff paper or sheet metal as desired, and it is preferably centered with respect to the center tube 13 by centering rings 44, each of which is provided with the apertures 45, as best shown in Fig. 4. Each ring has a central opening that is surrounded by an annular flange adapted to embrace the center tube 13, and the ring has an outer annular flange adapted to fit within the core 42 to center it, and each ring has an outwardly extending annular lip upon which an end of the core is seated as shown. The arrangement is such that the core holds these rings in firm contact with the end discs 39 and the rings 44 accurately center the core 42 with respect to the center tube.

Each end disc 39, in the construction shown, is provided with a grommet 46 through which oil that enters the lower ring 44 through the apertures 45 may enter the annulus 27 of the adaptor nut 25 and pass through the metering hole 29 to enter the second annulus 28, and then pass into the passage 30 to return to the crankcase. The grommet 46 which permits the filtered oil to pass from the filter cartridge to the nut 25 is needed only in the lower disc 39, but, as shown, is provided at both ends of the cartridge so that either end of this cartridge may be seated against the adaptor nut 25. Each end disc 39 has a central hole therein of a size to snugly receive the center tube 13. As a result, the cartridge 37 can be slipped over the tube 13 with either end disposed towards the outer end 11 of the shell, and the other end seated against the nut 25. The cartridge 37 is provided at its outer end with a sealing gasket 47 which is engaged by a metal ring 48 that is continuously pressed against the gasket by a coiled spring 49, one end of which is seated on this ring 48 and the other end abuts against the inner face of the end 11 of the shell. The gasket 47, it will be noted, is large enough to cover the grommet 46 to seal the same.

The operation of this part-flow cartridge of Fig. 1 is such that when oil is supplied thereto from the usual pump, through the aperture 18 to pass through the aperture 21 in the anti-flow disc 20, it will fill the shell 10 and the pressure of the oil surrounding the cartridge 37 will cause some of this oil to pass inwardly through the filter annulus 37 towards the center tube 13, as indicated by the arrows in Fig. 1. The rest of the oil in the shell 10 will flow through the by-pass valve 35 into the center tube 13. The filtered oil is prevented from reaching the tube 13 by providing a sleeve 50 which completely surrounds this tube and extends from one ring 44 to the other, as shown. As a result, the filtered oil will enter the apertures 45 in the ring 44 disposed near the casting 17 and after passing through these apertures can escape from the cartridge through the grommet 46 to enter the annular recess 27 in the nut 25, whereupon it can pass through the metering hole 29 to enter the second annular recess 28 and the drill hole 30 to return to the crankcase, as indicated by the arrow in Fig. 1. The cartridge 37 is called a part-flow cartridge because it is able to filter only a small portion of the stream of oil supplied to the engine bearing, and the oil which passes through such cartridge is not supplied to the engine bearings but is returned to the crankcase. The major portion of the oil that enters the filter 10 by-passes the cartridge 37 by forcing the valve 35 open to enter the tube 13, without being filtered, and passes to the engine bearings through the passage 31.

Having described the construction and operation of the part-flow filter of Figs. 1 and 3, the operation of the full-flow filter of Fig. 2 will now be described.

The oil filter construction is the same in Figs. 1 and 2, the only difference between these two figures is the difference in the cartridges. The cartridge 51 of Fig. 2 for the most part is similar in construction to the cartridge 37 of Fig. 1, but the full-flow cartridge is formed of resin treated paper 52 which has a much higher porosity than the pleated paper 38 of the part-flow cartridge, so that the full-flow cartridge will pass a larger stream of oil. To each end of the annulus formed of the pleated paper 52 is adhesively secured a closure disc 53. These discs may be formed of fibrous material, such as paper that is resin treated to strengthen the same. They have a central opening to receive the tube 13 and are firmly secured to the pleated ends by a binding paste such as plastisol. The end discs 53 of Fig. 2 are similar to the end discs 39 of Fig. 1, except that they do not have the grommets 46 shown in Fig. 1. At the inner face of each disc 53 is provided a centering ring 54 which may be similar to the rings 44 of Fig. 4, except that the rings 54 are not provided with the apertures 45 of the ring 44. Each ring 54 is provided with a central opening provided with a flange adapted to embrace the center tube 13, and each ring is also provided with an annulus adapted to fit the bore of the corrugated and perforated core 52. Each end of this core engages an annular lip of a ring 54 and holds the ring firmly against an end disc 53.

When the oil to be filtered is supplied to the apparatus of Fig. 2 so that the oil surrounds the cartridge 51, it will pass inwardly through the holes in the protecting wall 40 to penetrate through the pleated porous paper 52 of the filter annulus, and upon passing through this annulus it will enter the center tube 13 through the holes 32, as indicated by the arrows, so that this filtered oil may pass upwardly in the passage 31 of the casting on its way to the engine bearings. Should the cartridge 51 become clogged after long use, the increase in the pressure of the oil within the shell 10 will serve to open the bypass valve 35 and permit this unfiltered oil to enter the center tube, as indicated by the arrows, near the outer end of this tube, whereupon this unfiltered oil will pass to the engine bearings to make sure that these bearings will receive an ample supply of oil even if the cartridge is clogged. Since the end discs 53 of the full-flow cartridge 51 do not have an aperture leading to the annular recess 27, the filtered oil in this cartridge is prevented from reaching the drill hole 30 that leads to the crankcase, and all oil filtered by the cartridge 51 is delivered to the engine bearings.

Other types of cartridges than the pleated cartridges 37 and 51 may be used, in carrying out the present invention, provided the part-flow cartridge has an aperture like that indicated by 46 to allow the filtered oil to leave this cartridge, and also has a sleeve such as indicated by 50 that surrounds the center tube.

It will be seen from the foregoing that as a result of the present invention the oil filter shown may be employed as a full-flow filter or as a part-flow filter as desired; and that in order to change from one type of filter operation to the other, all that is necessary is to change from one type of cartridge to the other. Each cartridge is so constructed that it will effect the proper flow of the oil into and out of the cartridge shell so as to supply this oil to the engine bearings when the full-flow cartridge is used, and return the filtered oil to the crankcase when the part-flow cartridge is used. By providing the adaptor nut 25 having the annular recesses 27 and 28 in its opposite faces, it is not necessary to line up the grommet outlet 46 and metering hole 29 with the discharge passage 30, as these annular recesses make this unnecessary.

Having thus described my invention, what I claim and desire to protect by Letters Patent is:

1. A part-flow oil filter for motor vehicles, comprising a base and an oil confining shell removably secured to said base and having a discharge center tube extending from the base in the shell to discharge oil from the shell through the base, a relief valve in this tube for relieving excess pressure in the shell, a cartridge seat surrounding said tube and supported by the base and having a collector recess provided with a discharge passage leading therefrom to the motor crankcase, a part flow filter cartridge of the outside-in-flow type surrounding the tube and having opposite end walls both of which are in sealing relation with said tube and one of which walls sealingly engages said seat, and the wall which engages said seat having an aperture through which the filtered oil can reach said recess to be discharged therefrom.

2. An oil filter as in claim 1, wherein each disc is provided with a similar aperture so that oil can pass through one of the apertures into said recess when either disc engages said seat.

3. An oil filter as in claim 2, wherein when the aperture in one disc is delivering oil to said recess, the aperture in the other disc is closed.

4. A part-flow oil filter for motor vehicles, comprising a base and an oil confining shell removably secured to said base and having a discharge center tube extending from the base in the shell to discharge oil from the shell through the base, a relief valve in this tube for relieving excess pressure in the shell, a cartridge seat surrounding said tube and supported by the base, which has a passage through which filtered oil is discharged into the motor crankcase, a part flow filter cartridge of the outside-in-flow type surrounding the tube and provided with a sleeve that surrounds the tube and prevents the filtered oil from reaching the tube, and said cartridge having an end wall adjacent to said seat and provided with an aperture through which the filtered oil can pass into said passage and crankcase.

References Cited in the file of this patent

UNITED STATES PATENTS

| | | |
|---|---|---|
| 1,840,153 | Bull | Jan. 5, 1932 |
| 1,937,415 | Sidney | Nov. 28, 1933 |
| 2,027,876 | Pennebaker | Jan. 14, 1936 |
| 2,218,800 | Williams | Oct. 22, 1940 |
| 2,464,870 | Kamrath | Mar. 22, 1949 |
| 2,598,322 | Vokes | May 27, 1952 |
| 2,680,520 | Beardsley | June 8, 1954 |

FOREIGN PATENTS

| | | |
|---|---|---|
| 551,158 | Great Britain | Feb. 10, 1943 |
| 551,531 | Great Britain | Feb. 26, 1943 |